ial compositions, stabilize the resulting composition against deterioration by ultraviolet light. In accordance with a further aspect, this invention relates to the use of nickel derivatives of β-dithiones as polymer stabilizers against ultraviolet deterioration. In accordance with a further aspect, polyolefins such as polypropylene are stabilized against ultraviolet deterioration by incorporation of at least one nickel derivative of a β-dithione.

United States Patent Office 3,763,092
Patented Oct. 2, 1973

3,763,092
POLYMER STABILIZATION WITH NICKEL DERIVATIVES OF β-DITHIONES
Ronald D. Mathis, Taylors, S.C., and Jack P. Guillory, Bartlesville, Okla., assignors to Phillips Petroleum Company
No Drawing. Filed Dec. 14, 1971, Ser. No. 207,971
Int. Cl. C08f 45/62
U.S. Cl. 260—45.75 N                 8 Claims

ABSTRACT OF THE DISCLOSURE

Stabilizers comprising nickel derivatives of β-dithiones (thiodiketones) are incorporated into polyolefins to stabilize the polymers against ultraviolet light deterioration.

This invention relates to polymer stabilization. In accordance with another aspect, this invention relates to additives which, when incorporated into polymeric compositions, stabilize the resulting composition against deterioration by ultraviolet light. In accordance with a further aspect, this invention relates to the use of nickel derivatives of β-dithiones as polymer stabilizers against ultraviolet deterioration. In accordance with a further aspect, polyolefins such as polypropylene are stabilized against ultraviolet deterioration by incorporation of at least one nickel derivative of a β-dithione.

Polymers and copolymers such as polyethylene and polypropylene produced from olefins are frequently limited in their uses because of their tendency to undergo decomposition upon prolonged exposure to ultraviolet light. While a number of agents can be incorporated into such polymers to increase their resistivity to ultraviolet light, most affect the polymer in a manner which makes their addition to the polymer unsatisfactory.

There have now been developed certain stabilizers which, when incorporated into polymers, impart to the resulting composition a high degree of stability against ultraviolet light deterioration and whose incorporation is unobjectionable for other reasons. This invention provides such a class of compounds.

Accordingly, an object of this invention is to provide novel ultraviolet stabilizers for polymers.

A further object of this invention is to provide polymers having improved stability against ultraviolet deterioration.

A further object of this invention is to provide effective ultraviolet stabilizers for polyolefins.

Other objects and aspects as well as the several advantages of the invention will be apparent to those skilled in the art upon reading the specification and appended claims.

According to this invention, there is provided a polyolefin stabilizer which comprises nickel complexes of β-thiodiketone which complexes improve the resistance of the polyolefin to ultraviolet light.

In accordance with a specific embodiment, the resistance to ultraviolet light of polyolefins such as polypropylene is improved by the addition of a minor stabilizing amount of nickel dithio-6-methyl-2,4-heptanedione.

The ultraviolet stabilizers of the invention are the nickel derivatives of the β-dithiones (thiodiketones) having the general formula

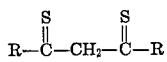

wherein R is a hydrocarbyl group having from 1 to 18, inclusive, carbon atoms, preferably 1 to 12, inclusive, carbon atoms. As used herein, the term "hydrocarbyl" includes open chain as well as cyclic hydrocarbon groups such as alkyl, aryl, and the like. These can be illustrated by groups such as methyl, ethyl, isopropyl, phenyl, benzyl, 4-biphenyl, cyclohexyl, and the like.

Representative examples of suitable ultraviolet light stabilizers that can be employed according to the invention include bis(2,4-pentanedithionato)nickel II, bis(2,4-hexanedithionato)nickel II, bis(6 - methyl - 2,4-heptanedithionato)nickel II, bis(1 - phenyl - 1,3-butanedithionato) nickel II, bis(1-[4-biphenyl]-1,3-butanedithionato)nickel II, bis(1 - phenyl - 6,6 - dimethyl-3,5-heptane-dithionato) nickel II, bis(1-cyclohexyl-1,3-butanedithionato)nickel II, and the like.

The stabilizers of the invention can be added to homopolymers and copolymers of 1-olefins having from 2 to 8, inclusive, carbon atoms per molecule. Representative examples of suitable polyolefins that can be stabilized according to the invention include polyethylene, polypropylene, ethylene-1-hexene copolymers, propylene-ethylene copolymers, ethylene-1-octene copolymers, poly(4-methylpentene-1) and the like. It is presently preferred to incorporate the stabilizers of the invention into polypropylene.

The amount of ultraviolet stabilizer incorporated with the polymer ranges from about 0.05 to 5.0 parts by weight (php.) per 100 parts by weight of the polymer. A more preferred range is 0.1 to 2.0 php.

It is also within the scope of the invention to add to the polymer compositions of the invention hindered phenol type additives to protect the polymer against the deleterious effects of heat and oxygen. One particularly preferred such hindered phenol type additive is Irganox 1076 (a product of Geigy Industrial Chemicals), which is octadecyl[3-(3,5-di-t-butyl-4-hydroxyphenyl)]propionate. It is also within the scope of the invention to use other types of phenolic stabilizers such as tetrakis[methylene(3,5-di-t-butyl - 4 - hydroxyhydrocinnamate)]methane, di-n-octadecyl(3,5-di-t-butyl-4-hydroxybenzyl)phosphonate, 2,6-di-t-butyl-4-methylphenol, 1,3,5-trimethyl-2,4,6-tris(3,5,-di-t-butyl - 4-hydroxybenzyl)benzene, 2,2'-methylene bis(6-t-butyl-4-methylphenol), and the like. The quantity of oxidation stabilizer used ranges from about 0.005 to 2.5 php. with about 0.02 to 1.0 php. presently preferred.

The additives are incorporated in the polymers by any conventional means. These include tumbling the additives in dry form or in the form of solutions or slurries derived from organic solvents such as acetone, ethanol, benzene, cyclohexane, etc. with polymer pellets or fluff or the use of intensive mixers with the above mixes, such as a Henschel mixer. Following the dry blending process, the mixtures are then blended with the polymer melt by means of a roll mill, Banbury mixer, Brabender Plastograph, extruder, and the like.

Other additives can be incorporated in the polymer also such as pigments, dyes, antistatic agents, other stabilizers, fillers, and the like.

The nickel complexes of β-thiodiketone can be prepared in a number of ways as is well known in the art, for example, as illustrated in Journal of Inorganic Chemistry, 8 (9) 1846 (1969).

SPECIFIC EXAMPLE

Nickel dithio-6-methyl-2,4-heptanedione was prepared according to the method of O. Siiman and J. Fresco [Inorganic Chemistry 8 (9), 1846 (1969)]. Dry HCl was bubbled for one hour at —60° C. through a solution of 0.075 mole 6-methyl-2,4-heptanedione dissolved in absolute alcohol. The HCl was replaced by H₂S gas and the bubbling continued for one-half hour, still at —60° C. A solution of 0.05 mole NiCl₂·6H₂O in 1/1 ethanol/water was added slowly. The nickel complex of the β-thiodiketone was obtained as a dark red precipitate. After filtering, the precipitate was washed with ethanol and water, and dried in vacuum.

A master batch of polypropylene fluff having a melt flow of about 3 as determined by ASTM D 1238–62T (Condition L) and a melting point of about 340° F. as determined by ASTM D 2117–64 containing 0.05 php. Irganox 1076, a commercial product which is octadecyl[3-(3,5 - di - t - butyl-4-hydroxyphenyl)]propionate was dry blended, and 0.5 php. nickel 6-methyl-2,4-heptanedione and 0.5 php. nickel dithio-6-methyl-2,4-heptanedione were wet blended (n-hexane) with separate portions of the master batch. Each sample was masticated in the Brabender Plastigraph at 200° C. for 5 minutes under nitrogen and 5 mil films compression molded. Triplicate samples were exposed in a twin enclosed carbon-arc Weather-Ometer modified by the incorporation of 8 fluorescent sun-lamps and operated without the spray cycle. Samples were tested every 20 hours for failure by flexing each strip in a rolling motion such that the entire length of the film sample was subjected to about a 180° bend. The test results are shown below:

| Sample No. | Additive | Hours to failure [1] |
|---|---|---|
| 1 | Control (0.05 php. Irganox 1076) | 80 |
| 2 | None | 53 |
| 3 | 0.5 php. nickel 6-methyl-2,4-heptanedione | 200 |
| 4 | 0.5 php. nickel dithio-6-methyl-2,4-heptanedione | 387 |

[1] Average of 3 samples.

These data show that the dithio derivative is far superior to the normal β-diketone complex in stabilizing polypropylene to ultraviolet light.

Referring to the above data, the dithio derivative (Sample 4) when incorporated into polypropylene provides about twice the protection (387 hours) against UV light that an equal weight of nickel 6-methyl-2,4-heptanedione (Sample 3), the corresponding oxygen-containing compound provides (200 hours).

We claim:
1. A composition stabilized against ultraviolet light deterioration comprising a polyolefin which is a homopolymer or copolymer of a 1-olefin and a UV stabilizing amount of at least one nickel complex of a β-dithione having the general formula

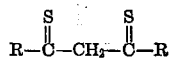

wherein R is a hydrocarbyl group having from 1 to 18, inclusive, carbon atoms.

2. A composition according to claim 1 wherein the nickel complex is nickel dithio-6-methyl-2,4-heptanedione.
3. A composition according to claim 1 wherein the amount of stabilizer present ranges from 0.05 to 5 weight parts per 100 parts by weight of the polymer.
4. A composition according to claim 1 wherein the polyolefin is polypropylene.
5. A composition according to claim 1 which additionally contains an oxidative inhibiting amount of a hindered phenol type antioxidant.
6. A composition according to claim 5 wherein said antioxidant is octadecyl[3-(3,5-di-t-butyl-4-hydroxyphenyl)]propionate.
7. A composition according to claim 6 wherein said nickel complex is nickel dithio-6-methyl-2,4-heptanedione.
8. A composition according to claim 7 wherein the polyolefin is polypropylene.

References Cited
UNITED STATES PATENTS

| | | | |
|---|---|---|---|
| 3,214,399 | 10/1965 | Saccomandi | 260—45.75 |
| 3,379,680 | 4/1968 | O'Konski | 260—45.75 |
| 3,579,478 | 5/1971 | Dunn et al. | 260—45.75 |
| 3,218,293 | 11/1965 | Geigle | 260—45.75 |
| 3,310,510 | 3/1967 | Breslow | 260—45.75 |

OTHER REFERENCES

Journal of Inorganic Chemistry 8 (9) 1846–1850 (1969).

DONALD E. CZAJA, Primary Examiner

E. C. RZUCIDLO, Assistant Examiner

U.S. Cl. X.R.

260—45.7 S, 45.85 B, 45.95 R